Jan. 19, 1965 R. F. E. STEGEMAN 3,166,754
TEMPLE HINGES
Filed Jan. 25, 1961
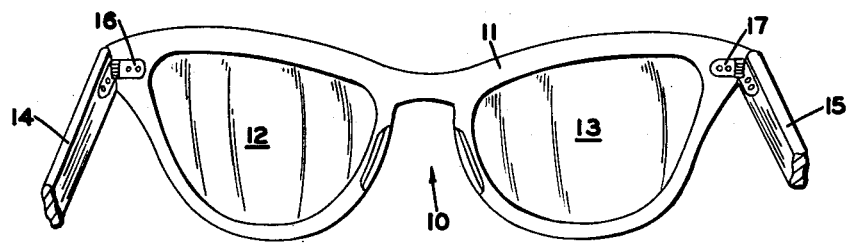
FIG. 1
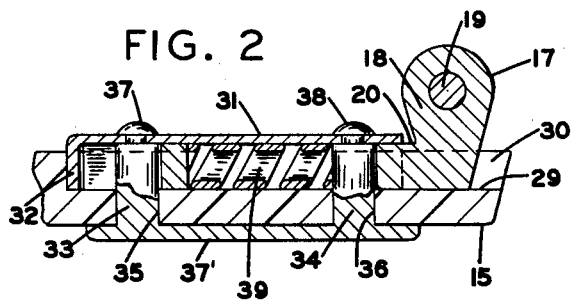
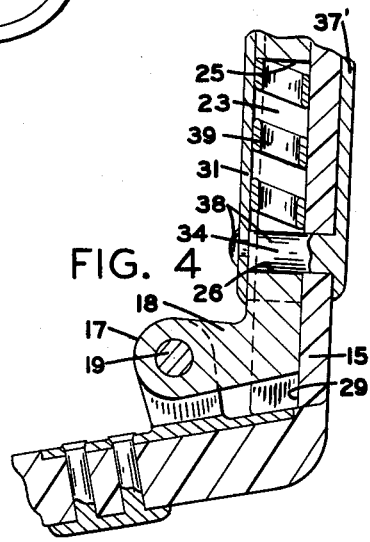
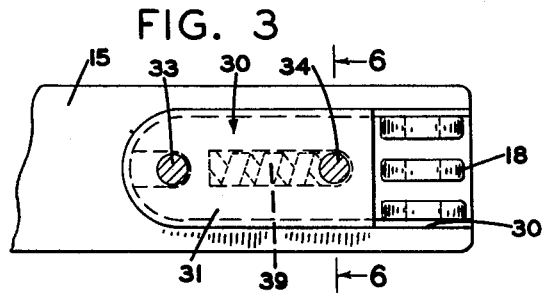
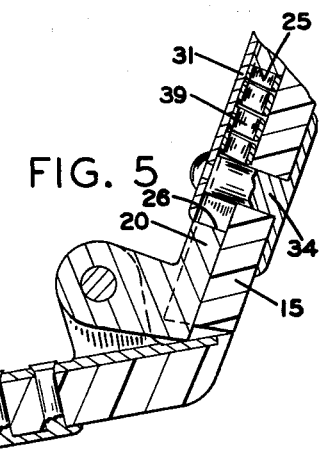
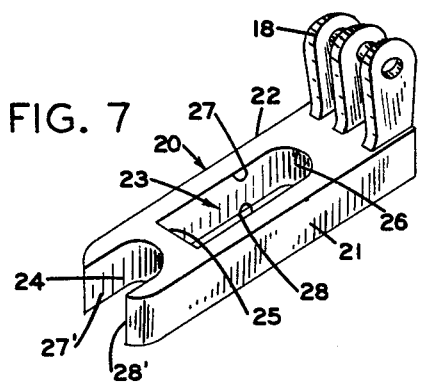
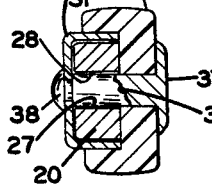
INVENTOR.
R.F.E. STEGEMAN
BY Frank C. Parker
ATTORNEY

United States Patent Office 3,166,754
Patented Jan. 19, 1965

3,166,754
TEMPLE HINGES
Raymond F. E. Stegeman, Greece, N.Y., assignor to Bausch & Lomb Incorporated, Rochester, N.Y., a corporation of New York
Filed Jan. 25, 1961, Ser. No. 84,784
1 Claim. (Cl. 351—153)

The present invention relates to ophthalmic mountings for sight correcting lenses and the like and relates more particularly to improvements in the temple hinges thereof.

In the manufacture of ophthalmic mountings, it is sometimes necessary or desirable to use stiff and unyielding construction materials for certain parts such as the temples thereof. When spectacles are so constructed, the normal open position of the temples is quite fixed and unyielding and comfort adjustments for the wearer cannot be made by the usual bending of the temples without distorting the aesthetic design thereof or risking breakage.

By reason of the above-mentioned difficulty, it is an object of this invention to provide an ophthalmic mounting having a novel mechanism for pivoting the temple parts thereon which is simple and inexpensive to manufacture and is rugged and reliable in operation.

It is a further object to provide such a device which permits the temple to be moved outwardly beyond normal open position for a limited distance when outward pressure is applied thereto, the mechanism by which this feature is accomplished being unobtrusive and of good appearance and well protected against entrance of foreign matter.

Further objects and advantages of this invention will be apparent in the details of construction and arrangement of the parts thereof by reference to the specification below and the accompanying drawing, wherein:

FIG. 1 is a rear elevational view of an ophthalmic mounting having structure according to this invention, FIG. 2 is a midsectional enlarged view of a temple end embodying a preferred form of this invention, FIG. 3 is an enlarged elevational side view of the mechanism shown in FIG. 2, FIG. 4 is an enlarged midsectional view of a temple hinge according to this invention as positioned in operative position, FIG. 5 is a view similar to FIG. 4, showing the temple hinge as it appears in another operative position, FIG. 6 is a cross-sectional view taken on the line 6—6 of FIG. 3, and FIG. 7 is a perspective view of a part of hinge structure comprised in this invention.

In FIG. 1 of the drawing is shown a pair of spectacles 10 having a frame 11 wherein is mounted a pair of ophthalmic lenses 12 and 13. On the outer side parts of the frame 11 are pivoted a pair of temples 14 and 15 by a pair of hinges 16 and 17, respectively.

According to this invention, the hinges 16 and 17 are constructed so as to hold the temples in normal position and upon application of pressure in an outward direction to yield or move outwardly by a limited amount.

In the preferred form of the present invention as shown in FIGS. 2 to 7, a temple hinge 17 is provided having a hinge element 18 and a pivot pin 19. Formed on the hinge element 18 is an elongated hinge plate 20 having parallel and straight sides 21 and 22 (FIG. 7). Interiorly of the hinge plate 20 are formed two elongated openings 23 and 24 in mutual alignment centrally of said plate. Opening 23 is provided with a square abutment surface 25 and a curved abutment surface 26 on its opposite ends for a purpose to be described presently and is also provided with a pair of straight and parallel guide surfaces 27 and 28 which connect said abutment surfaces. Opening 24 is formed with corresponding parallel guide surfaces 27' and 28' in the end of the plate 20, terminating near surface 25 and having the same width as opening 23.

The hinge plate 20 is slidably held on the smooth bottom surface 29 of a groove 30 formed in the end of the temple 15. Covering the hinge plate 20 almost completely so as to exclude all foreign matter is a retainer plate 31 having a depending or downwardly formed marginal flange 32 which extends along the sides and around one end thereof. Said flange 32 closely fits the sides of the groove 30 for good appearances and for exclusion of dirt and lint. The flange 32, which is seated on the bottom 29 of the groove 30, cooperatively provides therewith a cavity wherein the hinge plate 20 is slidably fitted for motion back and forth. For securing the retainer plate on the temple, a pair of rivets 33 and 34 are provided which extend through openings 35 and 36 in the temple, through the openings 23 and 24 in the hinge plate and are fixed in the retainer plate by any preferred means such as the riveting 37 and 38. The heads of the rivets 33 and 34 may be united in a plaquette 37' if desired, lying along the outer face of temple 15.

As shown in FIG. 2, resilient means in the form of a spring 39 is placed under compressive stress in the opening 23, the spring being seated at one end against the square abutment surface 25 and at the other end against the rivet 34 which acts as a stationary abutment member. When the spring 39 is in operative position, the curved abutment surface 26 of the hinge plate 20 is urged against the rivet 34 so that it acts as a stop for travel of the hinge plate and effectively provides the means for holding the temple in normal open position.

In this construction, the rivet 34 not only acts as a "normal position" stop for the hinge plate but also serves as the stationary abutment for the spring 39. Furthermore, the rivets or studs 33 and 34 not only serve as holding means for the retainer plate 31 but also may coact with the guide surfaces 27 and 28 to give a steady and reliable positioning of the hinge 17 and the attached temple 15 even under hard usage.

For purposes of this invention, the spring 39 is formed of flat wire as shown particularly in FIG. 2 whereby a large compressive stress is afforded without making the spring too large in diameter. It will be understood that the construction of the temple hinge 16 is a duplicate of hinge 17.

The novel features of this invention are well illustrated in the drawing which shows the yieldable hinge part nearly concealed and enclosed in the temple end, the parts thereof being particularly well constructed to maintain good alignment of the temples in all operative positions. Although but one form of this invention has been shown and described in detail, other forms thereof are possible and changes may be made in the construction and arrangement of details without departing from the spirit of the invention as claimed herebelow.

I claim:

A resilient hinge for pivotally mounting a temple on an ophthalmic frame so as to resiliently oppose pivoting movement of said temple outwardly beyond normal open position, said hinge comprising in combination a compression spring, an elongated hinge plate including a plurality of aligned hinge lugs disposed at one end of said hinge plate, said plate including a bottom surface disposed in sliding contact with a surface of said temple, a pair of parallel mutually spaced interior walls formed longitudinally of said plate and terminating at their ends in a pair of connecting walls, said walls forming an opening through said plate, the thickness of said plate and the distance between the first pair of walls slightly exceeding the diameter of the spring, and said spring disposed in and fully accommodated by the opening defined by said walls, a retainer plate overlaying the top and side surfaces of said hinge plate and fixed to said temple with sliding clearance between said retainer plate and said hinge plate, and an anchor stud extending through said temple and through said opening to secure the retainer plate on the temple in fixed operative position thereon, said spring bearing at one end under compressive stress against one side of said stud and at the other end against one of the connecting walls so that the opposite connecting wall is forced by the spring against the other side of said anchor stud to establish normal position of said hinge plate.

References Cited in the file of this patent

UNITED STATES PATENTS 2,976,766   Bianchi _____ Mar. 28, 1961

FOREIGN PATENTS 830,759   Great Britain _____ Mar. 23, 1960